(12) United States Patent
Fukano et al.

(10) Patent No.: US 8,561,491 B2
(45) Date of Patent: Oct. 22, 2013

(54) ELECTRIC ACTUATOR

(75) Inventors: Yoshihiro Fukano, Moriya (JP);
Ryuichi Masui, Bando (JP)

(73) Assignee: SMC Kabushiki Kaisha, Tokyo (JP)

( * ) Notice: Subject to any disclaimer, the term of this patent is extended or adjusted under 35 U.S.C. 154(b) by 586 days.

(21) Appl. No.: 12/271,037

(22) Filed: Nov. 14, 2008

(65) Prior Publication Data

US 2009/0140586 A1     Jun. 4, 2009

(30) Foreign Application Priority Data

Dec. 4, 2007   (JP) ................................. 2007-313442

(51) Int. Cl.
*F16H 3/06*     (2006.01)
*F16H 27/02*    (2006.01)
*F16H 29/02*    (2006.01)
*F16H 29/20*    (2006.01)

(52) U.S. Cl.
USPC ...................................................... 74/89.32

(58) Field of Classification Search
USPC ............ 74/89.23, 89.32, 89.33, 89.34, 89.37;
310/89, 64, 12.14, 20, 80; 384/17, 18, 384/49
See application file for complete search history.

(56) References Cited

U.S. PATENT DOCUMENTS

| | | | | |
|---|---|---|---|---|
| 2,631,709 A | * | 3/1953 | Anderson ...................... | 192/141 |
| 3,932,070 A | * | 1/1976 | Porter et al. ................ | 417/423.2 |
| 3,980,912 A | * | 9/1976 | Panza .............................. | 310/51 |
| 4,092,556 A | * | 5/1978 | Mabuchi ......................... | 310/57 |
| 4,331,209 A | * | 5/1982 | Bauer et al. .................. | 180/65.1 |
| 4,831,294 A | * | 5/1989 | Jussila ............................ | 310/63 |
| 5,081,384 A | * | 1/1992 | Rausch ............................ | 310/63 |
| 5,331,239 A | * | 7/1994 | Kwun et al. ................ | 310/68 R |
| 5,696,360 A | * | 12/1997 | Tiemeyer ...................... | 181/205 |
| 5,763,969 A | * | 6/1998 | Metheny et al. ............... | 310/62 |
| 5,809,831 A | * | 9/1998 | Nagai et al. .................... | 74/89.4 |
| 5,892,309 A | * | 4/1999 | Dreher ............................ | 310/80 |
| 5,910,694 A | * | 6/1999 | Yokozawa et al. ............. | 310/89 |

(Continued)

FOREIGN PATENT DOCUMENTS

| | | |
|---|---|---|
| JP | 58-124066 U | 8/1983 |
| JP | 6-296346 A | 10/1994 |

(Continued)

OTHER PUBLICATIONS

Office Action issued Oct. 20, 2010, in Korean Patent Application No. 10-2008-0122020 (with English translation of pertinent portion).

(Continued)

*Primary Examiner* — Joshua J Michener
*Assistant Examiner* — Keith Minter
(74) *Attorney, Agent, or Firm* — Oblon, Spivak, McClelland, Maier & Neustadt, L.L.P.

(57) ABSTRACT

In an electric actuator, a first bore portion in which a driving section is accommodated, and a second bore portion that extends in parallel with the first bore portion and in which a feed screw of a drive force transmission mechanism is inserted, are provided in the interior of an elongate body. Further, a rotary drive source of the driving section and the feed screw are connected through the drive force transmission mechanism. In addition, a drive force of the rotary drive source is transmitted to the feed screw through the drive force transmission mechanism for displacing a slider disposed on an upper portion of the body along an axial direction.

9 Claims, 15 Drawing Sheets

(56) References Cited

U.S. PATENT DOCUMENTS

| | | | |
|---|---|---|---|
| 5,925,960 A * | 7/1999 | Hayes | 310/211 |
| 6,145,395 A * | 11/2000 | Swanson et al. | 74/89.33 |
| 6,609,588 B2 * | 8/2003 | Mielke et al. | 180/444 |
| 7,923,875 B2 * | 4/2011 | Henry et al. | 310/89 |
| 2005/0193844 A1 * | 9/2005 | Angue et al. | 74/89.32 |
| 2005/0252319 A1 | 11/2005 | Kato | |
| 2005/0257633 A1 * | 11/2005 | Yamagishi | 74/89.33 |
| 2006/0156838 A1 * | 7/2006 | Las Navas Garcia | 74/89.23 |
| 2007/0284954 A1 * | 12/2007 | Lin et al. | 310/58 |

FOREIGN PATENT DOCUMENTS

| | | |
|---|---|---|
| JP | 7-264802 A | 10/1995 |
| JP | 8-103053 A | 4/1996 |
| JP | 8-290384 | 11/1996 |
| JP | 9-100888 A | 4/1997 |
| JP | 9-144830 | 6/1997 |
| JP | 10-259796 A | 9/1998 |
| JP | 11-122866 A | 4/1999 |
| JP | 2000-46140 A | 2/2000 |
| JP | 2001-513179 A | 8/2001 |
| JP | 2003-97660 A | 4/2003 |
| JP | 2003-309990 | 10/2003 |
| JP | 2005-321062 | 11/2005 |
| JP | 2005-329500 A | 12/2005 |
| JP | 2006-50885 A | 2/2006 |
| JP | 2006-233995 A | 9/2006 |

OTHER PUBLICATIONS

Office Action issued Feb. 26, 2013 in Japanese Patent Application No. 2008-302142 (with partial English-language translation).

* cited by examiner

ELECTRIC ACTUATOR

BACKGROUND OF THE INVENTION

1. Field of the Invention

The present invention relates to an electric actuator, which causes a displacement member to be moved by transmitting a drive force of a driving section to the displacement member through a feed screw.

2. Description of the Related Art

Heretofore, as a means for transporting a workpiece or the like, electric actuators have widely been known, in which a feed screw is driven rotatably by the rotary drive force of a rotary drive source such as a motor or the like, and a slider that transports the workpiece is displaced thereby.

With this type of electric actuator, for example, as disclosed in Japanese Laid-Open Patent Publication No. 09-144830, a table is disposed for displacement along a guide rail, and a drive source is disposed in parallel to the guide rail, the drive source being connected to a support plate disposed on one end of the guide rail through a bracket. In addition, the drive (rotative) force output from the drive source is transmitted to a screw shaft, which is disposed inside the guide rail, through a drive pulley, a driven pulley and a toothed belt, which collectively constitute a force transmission mechanism. Then, the screw shaft is rotated, and a nut member screw-engaged with the screw shaft is displaced along the axial direction. Further, along therewith, a table, which is connected to a nut member, is displaced along the guide rail.

Incidentally, in the conventional technique according to Japanese Laid-Open Patent Publication No. 09-144830, the guide rail including the table and the drive source that generates a drive force for displacing the table are disposed in parallel, and further, are mutually connected together through the bracket, which is provided separately from the guide rail. Owing thereto, the number of parts required to construct the electric actuator increases, inviting an increase in production costs and the number of assembly steps, and the apparatus itself becomes larger in scale.

Recently, due to constraints imposed on the usage environment for electric actuators, the equipment installation space and the like, there have been demands for an electric actuator having a low profile, in which the height dimension of the electric actuator is suppressed.

SUMMARY OF THE INVENTION

A general object of the present invention is to provide an electric actuator, which is minimized in a longitudinal direction thereof as well as in a lateral direction perpendicular to the longitudinal direction, and further, wherein high rigidity thereof is assured, and the heat dissipating capability of the electric actuator can be enhanced.

The present invention is characterized by an electric actuator, in which a drive force of a driving section is transmitted to a displacement member through a drive force transmission belt, the electric actuator including a body having accommodating portions therein, a driving section disposed in the accommodating portion and driven by an electric signal, a feed screw disposed in the accommodating portion and rotated under a driving action of the driving section, a drive force transmission mechanism for transmitting a drive force output in the driving section to the feed screw, and a displacement member disposed for displacement along an axial direction on the body, wherein the driving section and the feed screw are disposed in parallel through the accommodating portions.

According to the present invention, because the driving section and the feed screw are arranged respectively in accommodating portions within a single body, in comparison with an electric actuator in which the driving section and feed screw are disposed respectively in separate bodies, the rigidity of the electric actuator in its entirety including the body can be enhanced, together with minimizing both the longitudinal direction of the actuator as well as the lateral dimension thereof perpendicular to the longitudinal direction.

The above and other objects features and advantages of the present invention will become more apparent from the following description when taken in conjunction with the accompanying drawings in which preferred embodiments of the present invention are shown by way of illustrative example.

DESCRIPTION OF THE PREFERRED EMBODIMENTS

Figure 1:
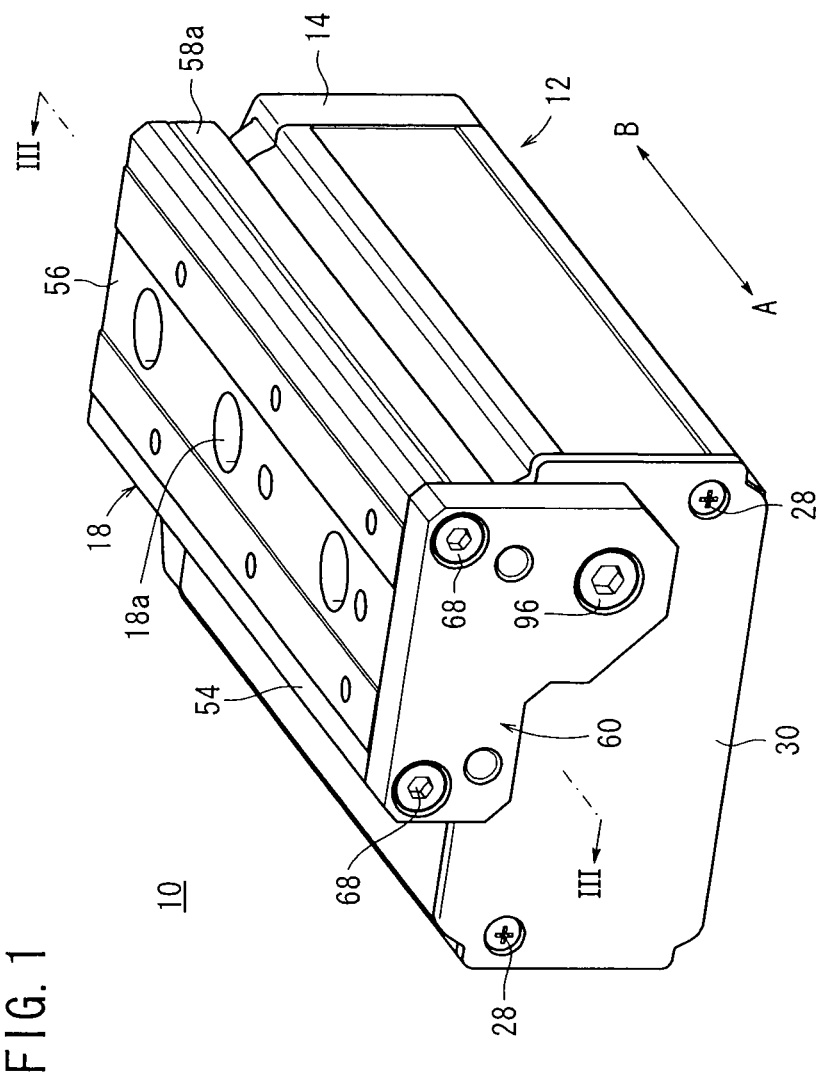
FIG. 1 is an exterior perspective view of an electric actuator according to an embodiment of the present invention.
Figure 2:
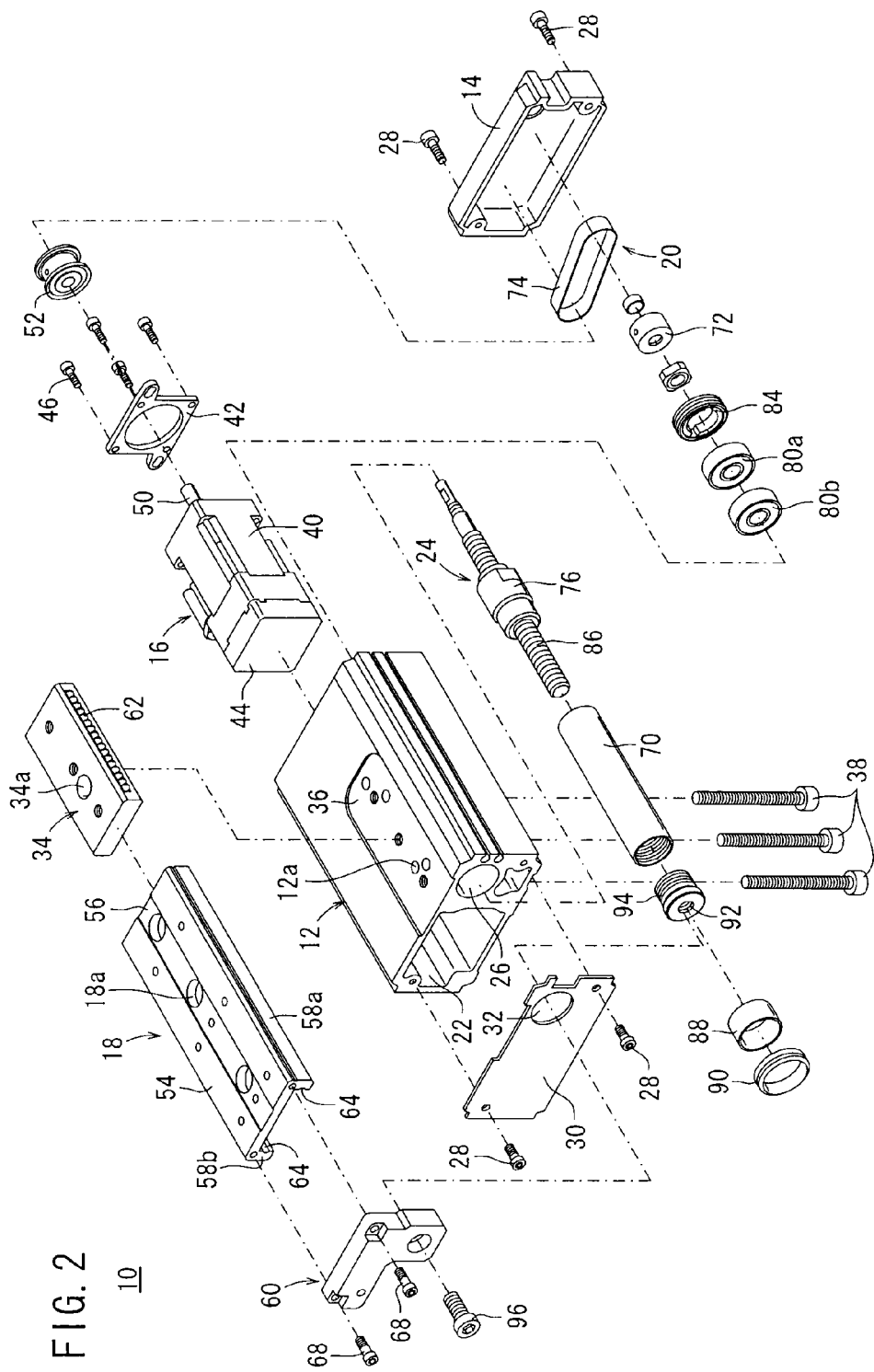
FIG. 2 is an exploded perspective view of the electric actuator shown in FIG. 1.
Figure 3:
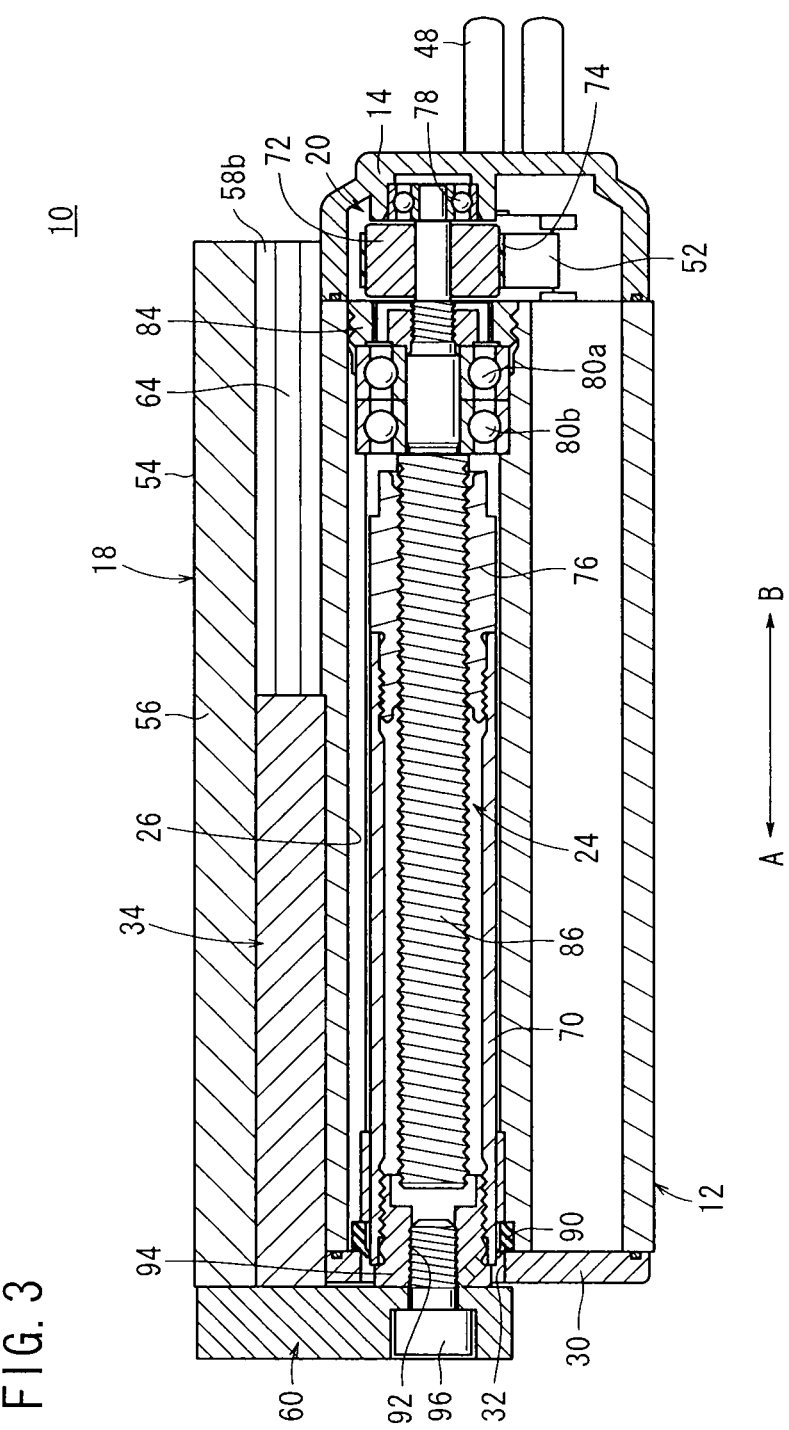
FIG. 3 is a longitudinal cross sectional view of the electric actuator shown in FIG. 1.
Figure 4:
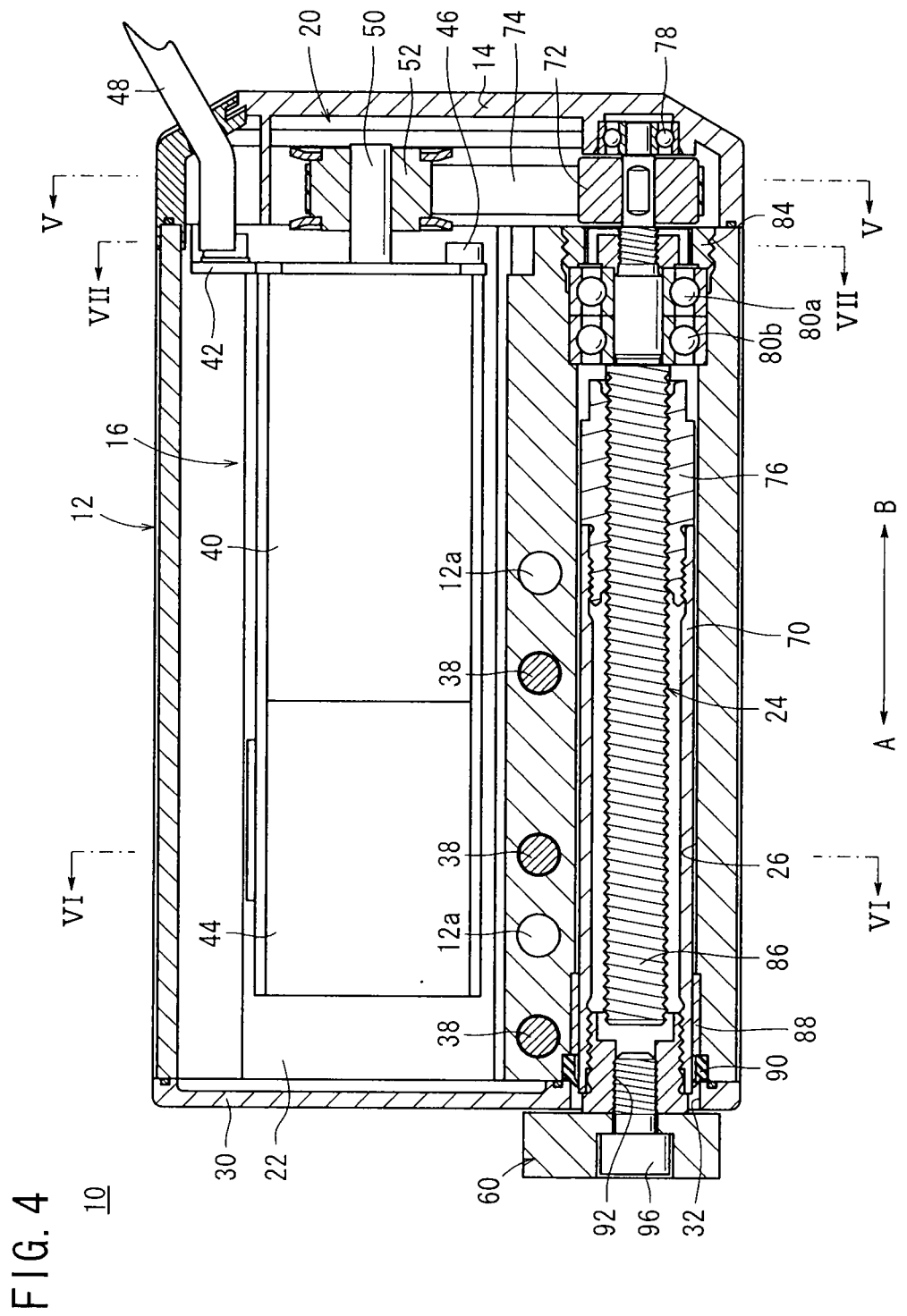
FIG. 4 is a lateral cross sectional view of the electric actuator shown in FIG. 1.
Figure 5:
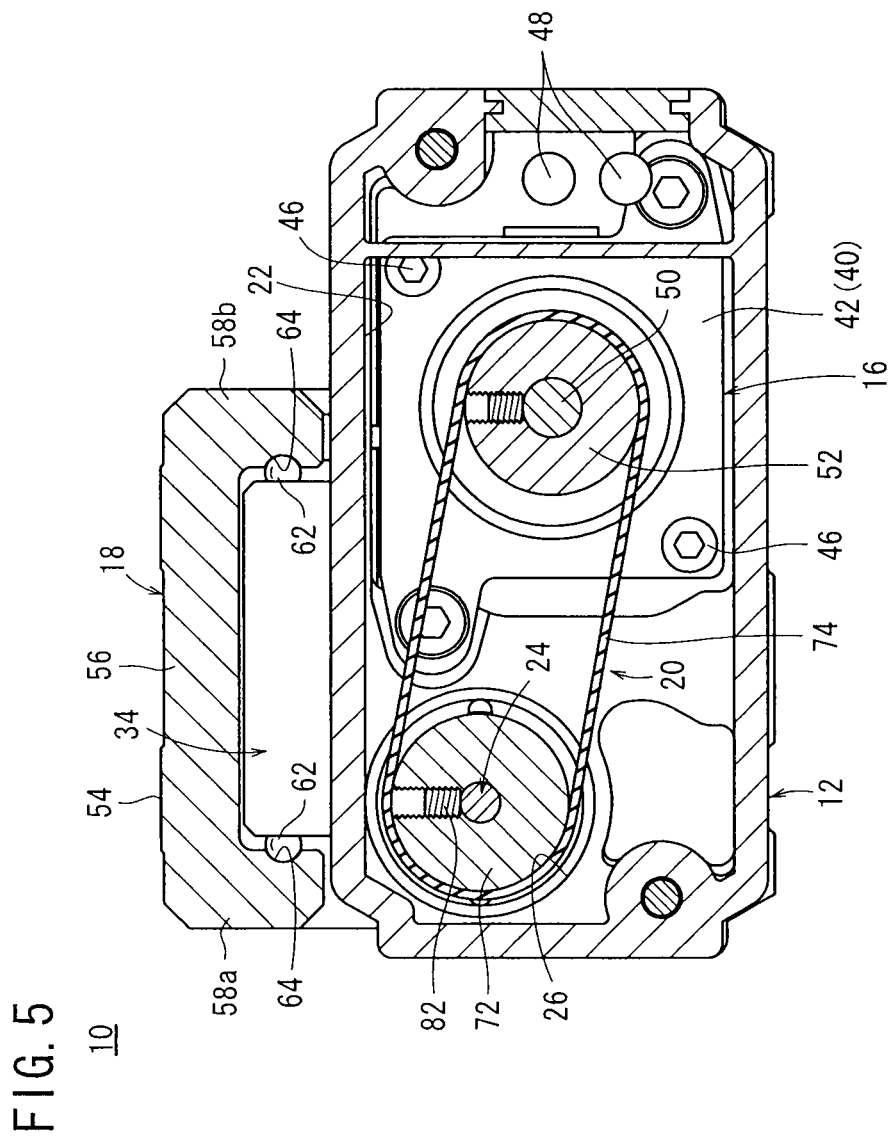
FIG. 5 is a cross sectional view taken along line V-V of FIG. 4.
Figure 6:
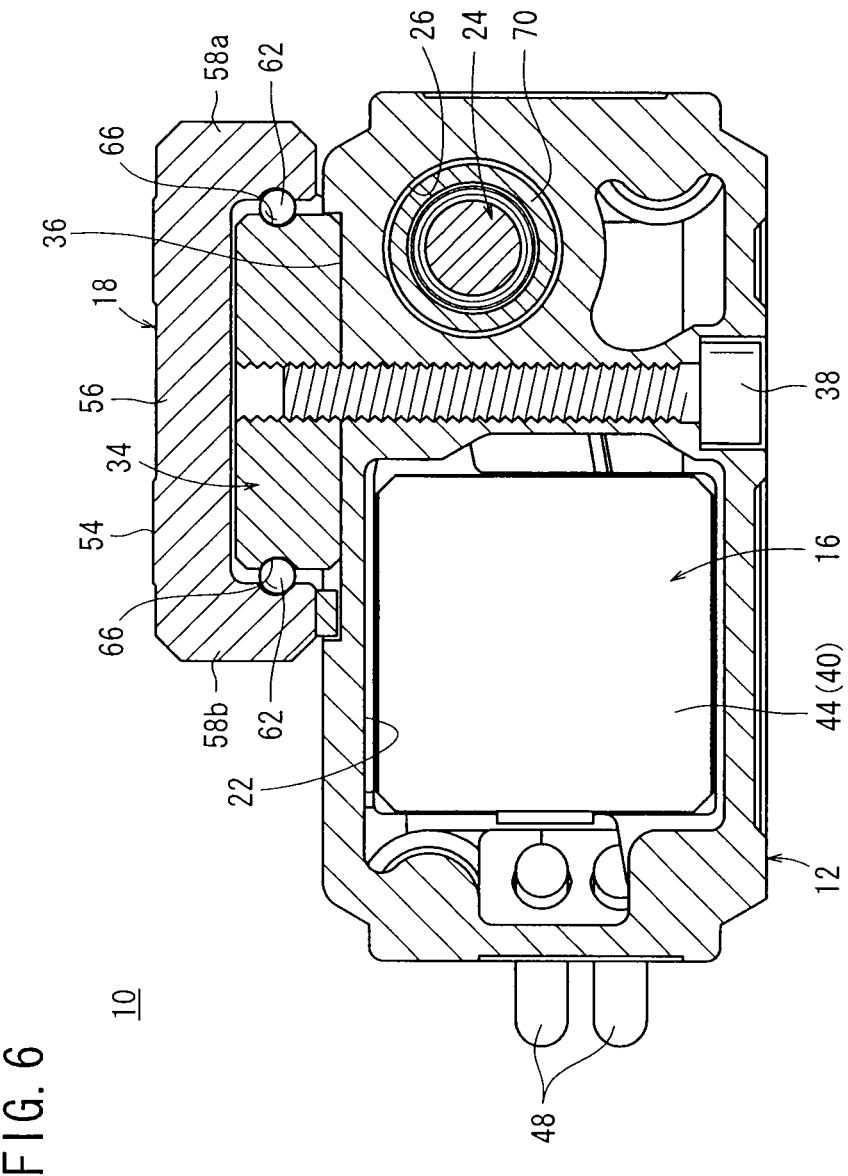
FIG. 6 is a cross sectional view taken along line VI-VI of FIG. 4.

In FIG. 1, reference numeral 10 indicates an electric actuator according to an embodiment of the present invention.

The electric actuator 10, as shown in FIGS. 1 through 4, includes an elongated body 12 that extends along the axial direction (the direction of arrows A and B), a pulley cover 14 connected to one end of the body 12, a driving section 16 accommodated in the interior of the body 12 and which is driven by an electric signal, a slider (displacement member) 18 disposed on an upper part of the body 12 for transporting an unillustrated workpiece, and a drive force transmission mechanism 20 for transmitting a drive force from the driving section 16 to the slider 18.

Figure 7:
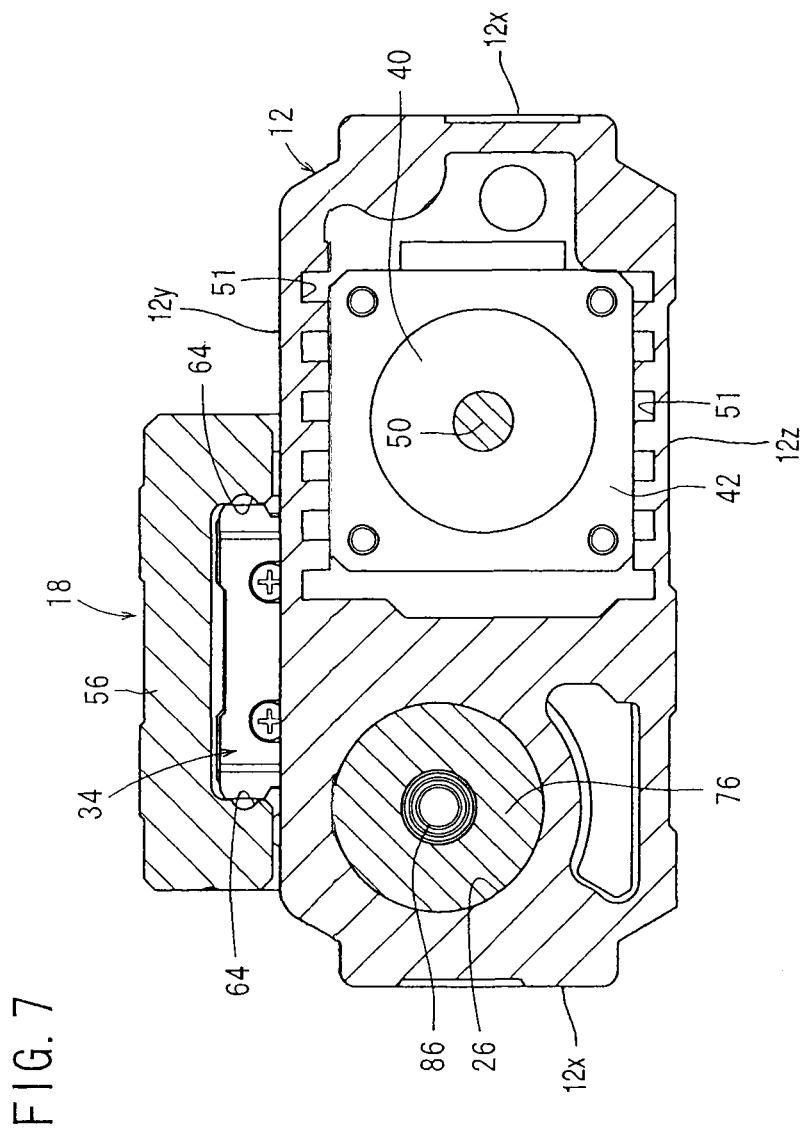
FIG. 7 is a cross sectional view taken along line VII-VII of FIG. 4.

The body 12, for example, is formed in a hollow shape from a metallic material by extrusion molding, stretch molding, or die-cast molding. The body 12, in the interior thereof, includes a first bore portion (accommodating portion) 22 that extends along the axial direction (the direction of arrows A and B) in which the driving section 16 is accommodated, and a second bore portion (accommodating portion) 26 that extends in parallel with the first bore portion 22 and in which a feed screw 24 constituting the drive force transmission mechanism 20 is inserted. In the embodiment, the body 12 is generally rectangular with shorter side surfaces 12x extending in the axial direction, and longer upper and lower surfaces 12y, 12z, respectively, extending in the axial direction (FIG. 7). The first bore portion 22 and the second bore portion 26 extend side-by-side and are positioned laterally to one another and along the direction of a line connecting the shorter side surfaces 12x.

A pulley cover 14 is connected by cover bolts 28 to one end of the body 12, thereby closing and blocking one end side of the first and second bore portions 22, 26. On the other hand, a plate-shaped cover plate 30 is affixed to the other end of the body 12 through cover bolts 28, and a hole 32 is formed in the cover plate 30 in a position confronting the second bore portion 26. That is, the cover plate 30 closes and blocks the other end side of the first bore portion 22, and communicates with the second bore portion 26 through the hole 32. The hole 32 is formed for enabling insertion therethrough of a rod 70, which constitutes part of the drive force transmission mechanism 20.

Further, a recess 36 in which a guide block 34 is installed is formed on an upper surface 12y of the body 12. The guide block 34 is fixed in the recess 36 by a plurality of fixing bolts 38 inserted through the body 12. Specifically, by insertion of a part of the guide block 34 into the recess 36, the guide block 34 is positioned with respect to the body 12.

The driving section 16, for example, includes a rotary drive source 40 made up from a stepping motor, a base plate 42 by which the rotary drive source 40 is affixed with respect to the body 12, and a detector 44 that detects a rotation amount of the rotary drive source 40. The rotary drive source 40 is affixed to the body 12 through the base plate 42 by fastening bolts 46, and includes a lead line 48 to which an electric signal is supplied, and a drive shaft 50, which is driven rotatably under energization from the electric signal. A drive pulley 52 making up part of the drive force transmission mechanism 20 is connected to the drive shaft 50 and is rotated together with the drive shaft 50.

The base plate 42, for example, is formed from a metallic material such as aluminum or the like, the base plate 42 being retained and supported by the body 12. Additionally, a plurality of heat dissipating grooves 51 (see FIG. 7), which extend in the axial direction (the direction of arrows A and B) of the body 12 and are separated mutually by a predetermined distance, are formed on the inner wall surface, at the location of the first bore portion 22, of the body 12. The base plate 42 is disposed and positioned to face toward the heat dissipating grooves 51.

Further, the heat dissipating grooves 51 are formed in predetermined lengths along the axial direction of the body 12 so as to cover the rotary drive source 40 and the base plate 42. Owing thereto, generation of heat from the rotary drive source 40 can effectively be dissipated (radiated) to the exterior of the body 12.

The slider 18 is substantially U-shaped in cross section, including a main body portion 56 having a table surface 54 on which a non-illustrated workpiece is mounted, a pair of side wall portions 58a, 58b which are bent respectively from both sides of the main body portion 56, and an end plate 60 that covers one end of the main body portion 56.

First ball grooves 64 in which a plurality of balls 62 are disposed extend along inner wall surfaces of the side wall portions 58a, 58b. The balls 62 are retained between the first ball grooves 64 and second ball grooves 66, which are provided on both side surfaces of the guide block 34.

That is, the slider 18 is disposed for displacement along the axial direction (the direction of arrows A and B) with respect to the guide block 34, via the plurality of balls 62 disposed on the inner side thereof.

Further, an end plate 60 is connected to an end of the slider 18 through connecting bolts 68. The end plate 60 is disposed perpendicularly to the extending direction (the direction of arrows A and B) of the main body portion 56, and a rod 70, which makes up part of the drive force transmission mechanism 20, is connected to a lower portion of the end plate 60.

The drive force transmission mechanism 20 includes a drive pulley 52 connected to the drive shaft 50 of the rotary drive source 40, the feed screw 24, which is supported rotatably inside the second bore portion 26, a driven pulley 72 connected to one end of the feed screw 24, a timing belt 74 suspended between the drive pulley 52 and the driven pulley 72, and a displacement nut 76, which is threaded onto the outer circumferential surface of the feed screw 24.

The feed screw 24 is formed into an elongate shape extending in the axial direction (the direction of arrows A and B), one end of which is rotatably supported by a first bearing 78 disposed in the pulley cover 14, and by a pair of second bearings 80a, 80b disposed in the second bore portion 26 of the body 12. The driven pulley 72 is disposed between the first and second bearings 78, 80a, 80b, and is affixed via a fixing screw 82. The second bearings 80a, 80b are retained inside the second bore portion 26 by a lock nut 84, which is threaded into the second bore portion 26.

On the other hand, a threaded portion 86, in which screw threads are engraved from the region supported by the second bearings 80a, 80b and toward the other end side thereof (in the direction of arrow A), is formed on the outer circumferential surface of the feed screw 24, and a cylindrically shaped displacement nut 76 is screw-engaged with the threaded portion 86. More specifically, the rotary drive force from the driving section 16 is transmitted to the feed screw 24 through the timing belt 74 and the driven pulley 72, whereupon by rotation of the feed screw 24, the displacement nut 76 is displaced along the axial direction (the direction of arrows A and B).

A cylindrical rod 70 is connected to the displacement nut 76 on the other end side (in the direction of arrow A) of the feed screw 24, and is disposed for displacement along the axial direction (the direction of arrows A and B) together with the displacement nut 76. The rod 70 is supported along the axial direction by a guide body 88, which is disposed at the other end of the second bore portion 26. A seal member 90 adjacent to the guide body 88 prevents the invasion of dust or the like from the outside into the interior of the second bore portion 26, by abutment against an outer circumferential surface of the rod 70.

Further, the displacement nut 76 is connected to one end of the rod 70, whereas a socket 94 having a screw hole 92 therein is installed into the other end of the rod 70, and an end plate 60 is connected to the rod 70 through a fixing bolt 96, which is threaded into the screw hole 92. Specifically, under a rotary action of the feed screw 24, the displacement nut 76 and the rod 70 are displaced in the axial direction (the direction of arrows A and B) along the second bore portion 26, whereupon the slider 18 also is displaced through the end plate 60, which is connected to the rod 70.

The electric actuator according to the embodiment of the present invention is basically constructed as described above. Next, operations and effects of the electric actuator 10 shall be explained. Herein, the state shown in FIG. 4, in which the displacement nut 76 is positioned on the side closest to the pulley cover 14 (the direction of arrow B), shall be described as an initial condition.

First, an electric signal (e.g., a pulse signal) is supplied to the driving section 16 from an unillustrated power source, whereupon by rotation of the rotary drive source 40 based on the electric signal, the drive pulley 52 provided in the base body is rotated. In addition, under a driving action of the drive pulley 52, the driven pulley 72 is rotated integrally therewith through the timing belt 74, and the feed screw 24 connected to the driven pulley 72 is rotated while in a state of being supported by the first and second bearings 78, 80a, 80b.

Figure 8:
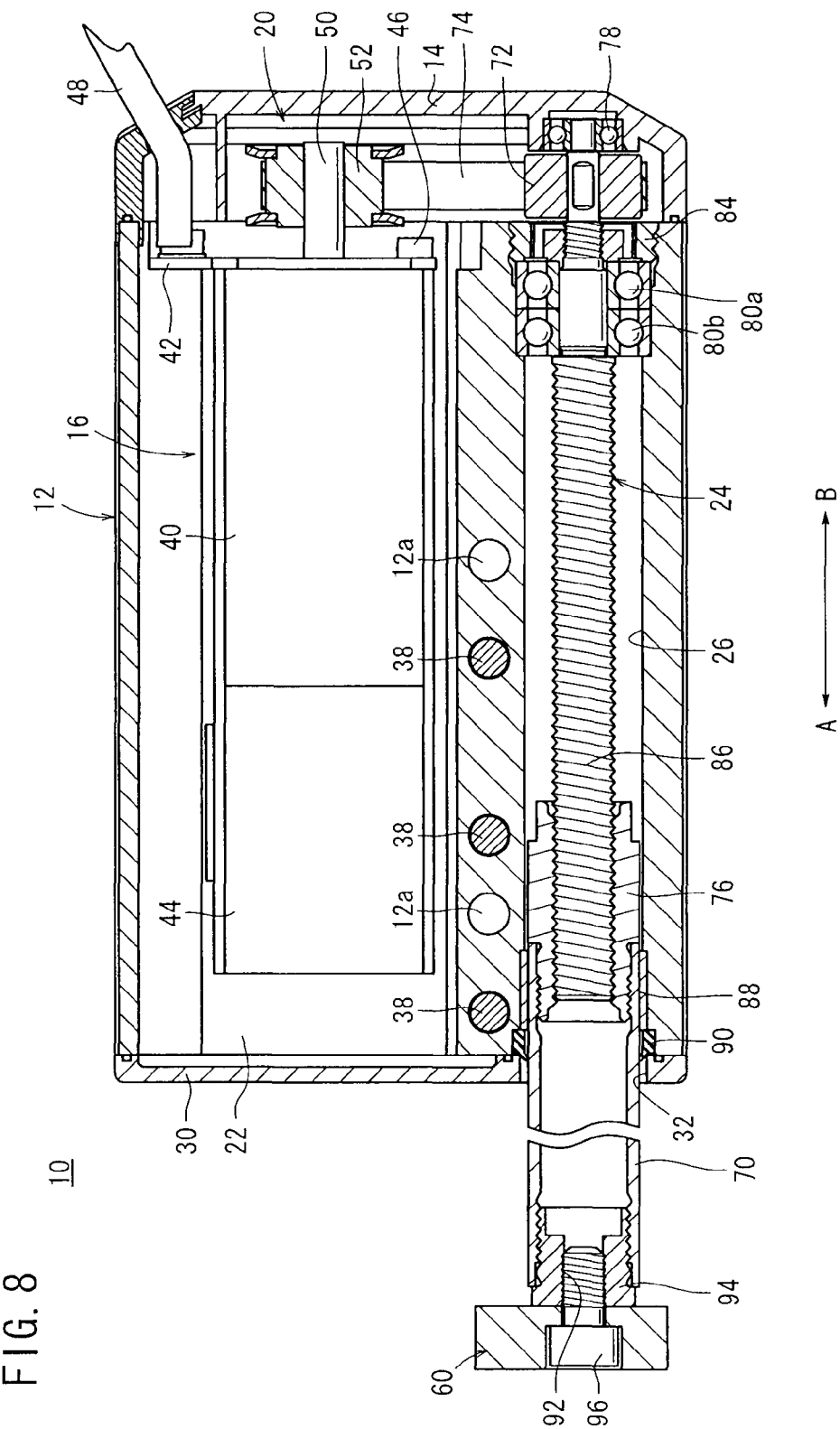
FIG. 8 is a lateral cross sectional view showing a state in the electric actuator of FIG. 4, in which a slider is displaced in a direction away from a pulley cover.

As a result, the displacement nut 76, which is threaded over the feed screw 24, is displaced in a direction (the direction of arrow A) away from the pulley cover 14, whereupon by displacement of the rod 70 together with the displacement nut 76, the slider 18 is displaced linearly along the guide block 34 in a direction (the direction of arrow A) to separate from the pulley cover 14 (see FIG. 8). At this time, the slider 18 is guided smoothly along the axial direction through the plurality of balls 62 disposed between the slider 18 and the guide block 34.

On the other hand, by reversing the characteristics of the electric signal supplied to the driving section 16, and causing the rotary drive source 40 to be rotated in an opposite direction based on the electric signal, the drive pulley 52, the timing belt 74, and the driven pulley 72 are rotated in opposite directions.

Owing thereto, the displacement nut 76, which is screw-engaged with the feed screw 24, is displaced in a direction (the direction of arrow B) to approach toward the pulley cover 14, whereupon by displacement of the rod 70 together with the displacement nut 76, the slider 18 is displaced linearly along the guide block 34 toward the side of the pulley cover 14 (in the direction of arrow B) and is restored to the initial position.

In the foregoing manner, in the present embodiment, because the rotary drive source 40 that makes up the driving section 16 and the feed screw 24 that makes up the drive force transmission mechanism 20 can be accommodated inside of a single body 12, compared to an electric actuator in which the drive source and screw shaft each are disposed separately, the rigidity of the electric actuator 10 in its entirety can be improved.

Further, by accommodating the rotary drive source 40 in the interior of the body 12, compared to a case of being disposed respectively in a separate housing, the longitudinal direction of the electric actuator 10 as well as the lateral dimension perpendicular to the longitudinal direction can be made smaller in scale.

Furthermore, by affixing the rotary drive source 40 to the base plate 42, which is made from a metallic material such as aluminum or the like, and further, by providing a plurality of heat dissipating (radiating) grooves 51 at upper and lower inner wall surfaces of the interior of the body 12 in which the rotary drive source 40 is accommodated, and perpendicular to the second bore portion 26, heat can readily be dissipated to the outer surfaces 12y, 12z and the heat dissipating properties in the electric actuator 10 can be improved. As a result, it becomes possible for the electric actuator 10 to be driven at a suitable temperature.

Figure 9:
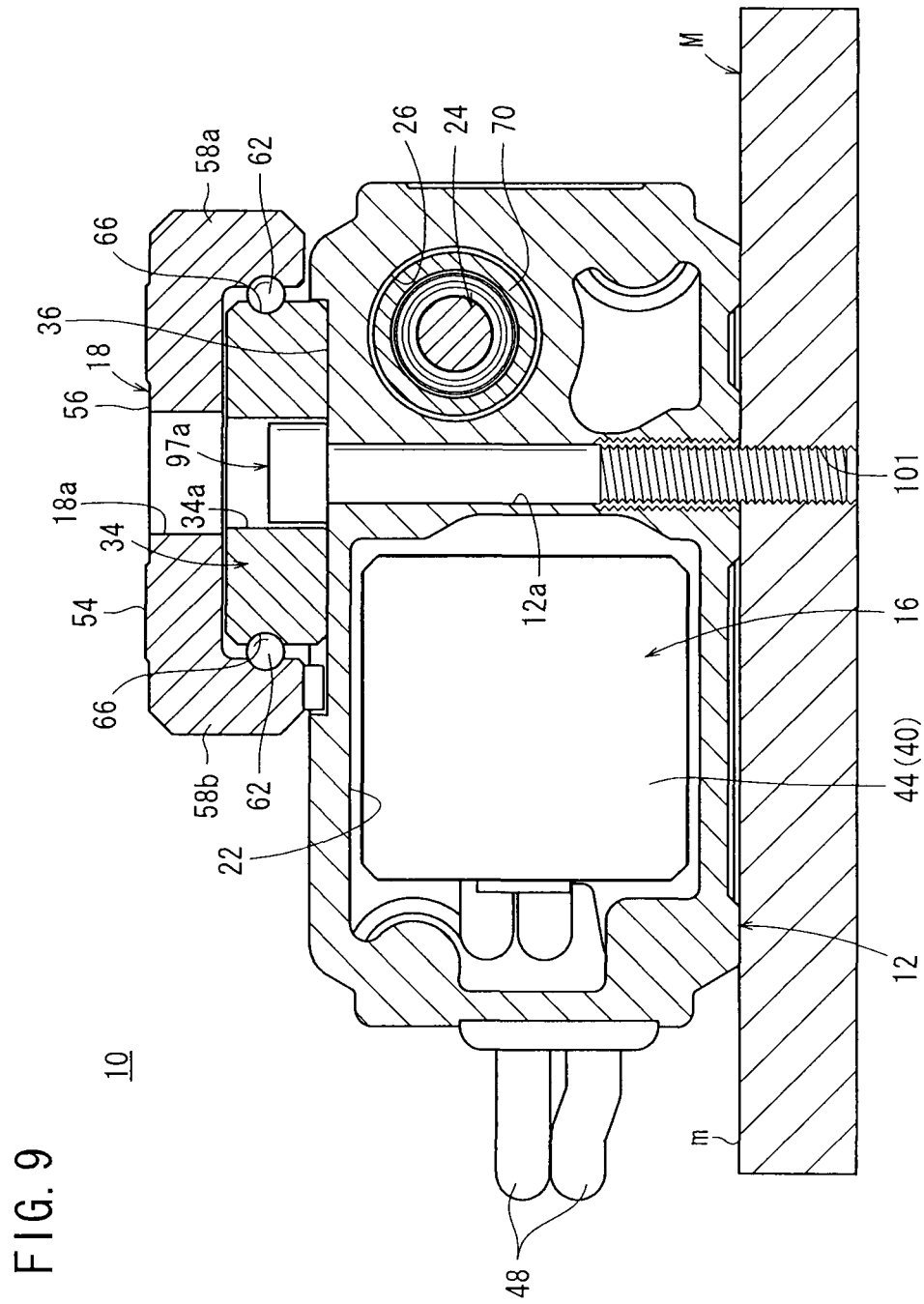
FIG. 9 is a lateral cross sectional view showing a case in which the electric actuator is fixed to another apparatus by a fixing bolt.

Still further, as shown in FIG. 9, a fixing bolt 97a is inserted from above through the slider 18, a hole 34a of the guide block 34 and a hole 12a of the body 12, and is screw-engaged with a screw hole 101 formed in another apparatus M to fix the body 12 on the other apparatus M. Thus, the electric actuator 10 including the body 12 thereof can reliably be fixed onto an attachment surface m of the other apparatus M, and the ability for attachment of the electric actuator 10 is improved. Further, because the fixing bolt 97a is accommodated completely inside of the aforementioned guide block 34 and body 12, the fixing bolt 97a is not exposed to the exterior and does not project outwardly from the electric actuator 10, which is advantageous. The holes 12a, 34a extend through the body 12 and the guide block 34 in a direction perpendicular to an axis of the body 12.

Figure 10:
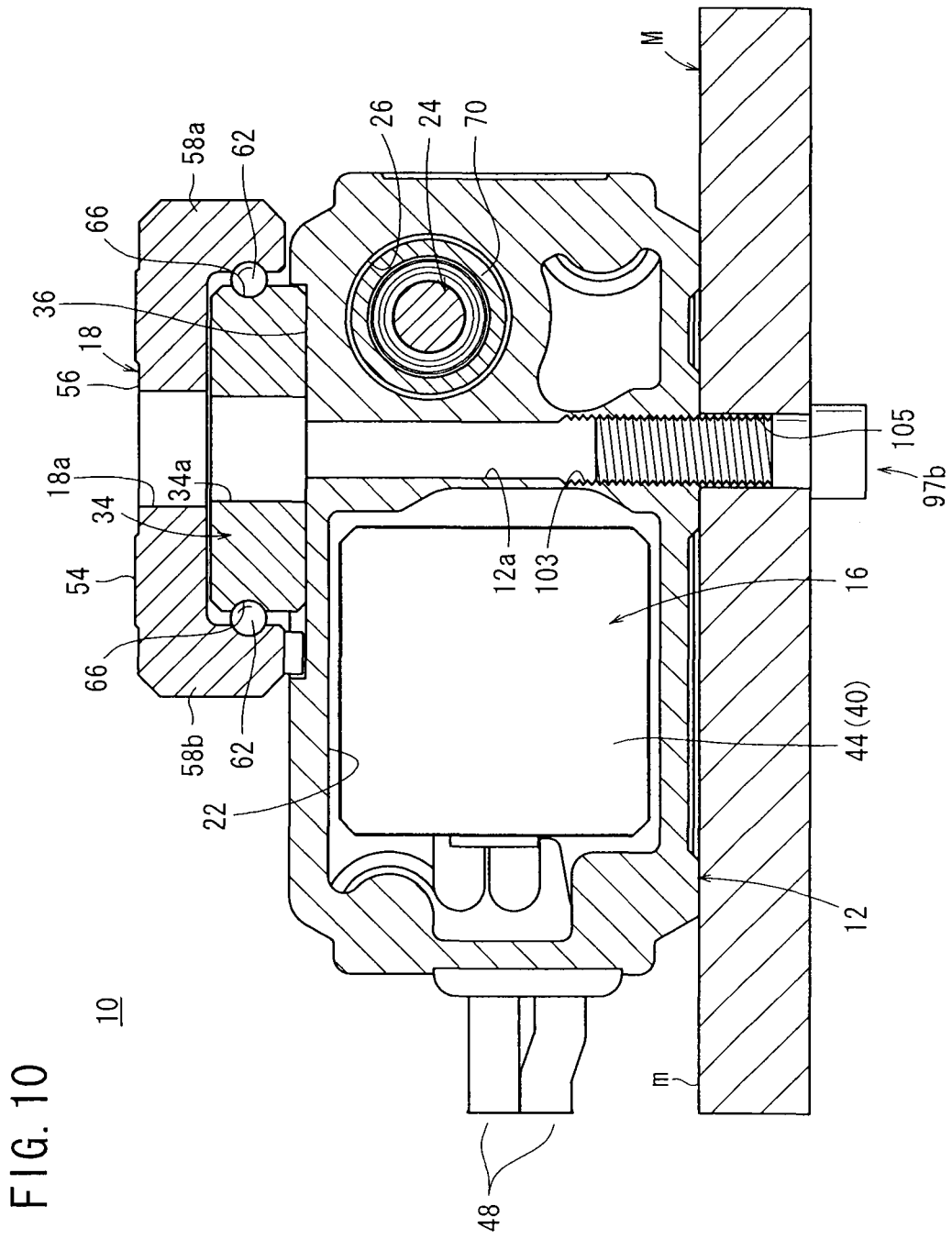
FIG. 10 is a lateral cross sectional view showing another case in which the electric actuator is fixed to another apparatus by a fixing bolt.

On the other hand, as shown in FIG. 10, in a state where the electric actuator 10 is placed on the above-mentioned attachment surface m of the other apparatus M, a fixing bolt 97b that is inserted from below through a through hole 105 of the other apparatus M may be screw-engaged with an attachment screw hole 103 formed in the body 12. Thus, the electric actuator 10 including the body 12 thereof can reliably be fixed onto an attachment surface m of the other apparatus M, and the ability for attachment of the electric actuator 10 is improved.

Figure 11:
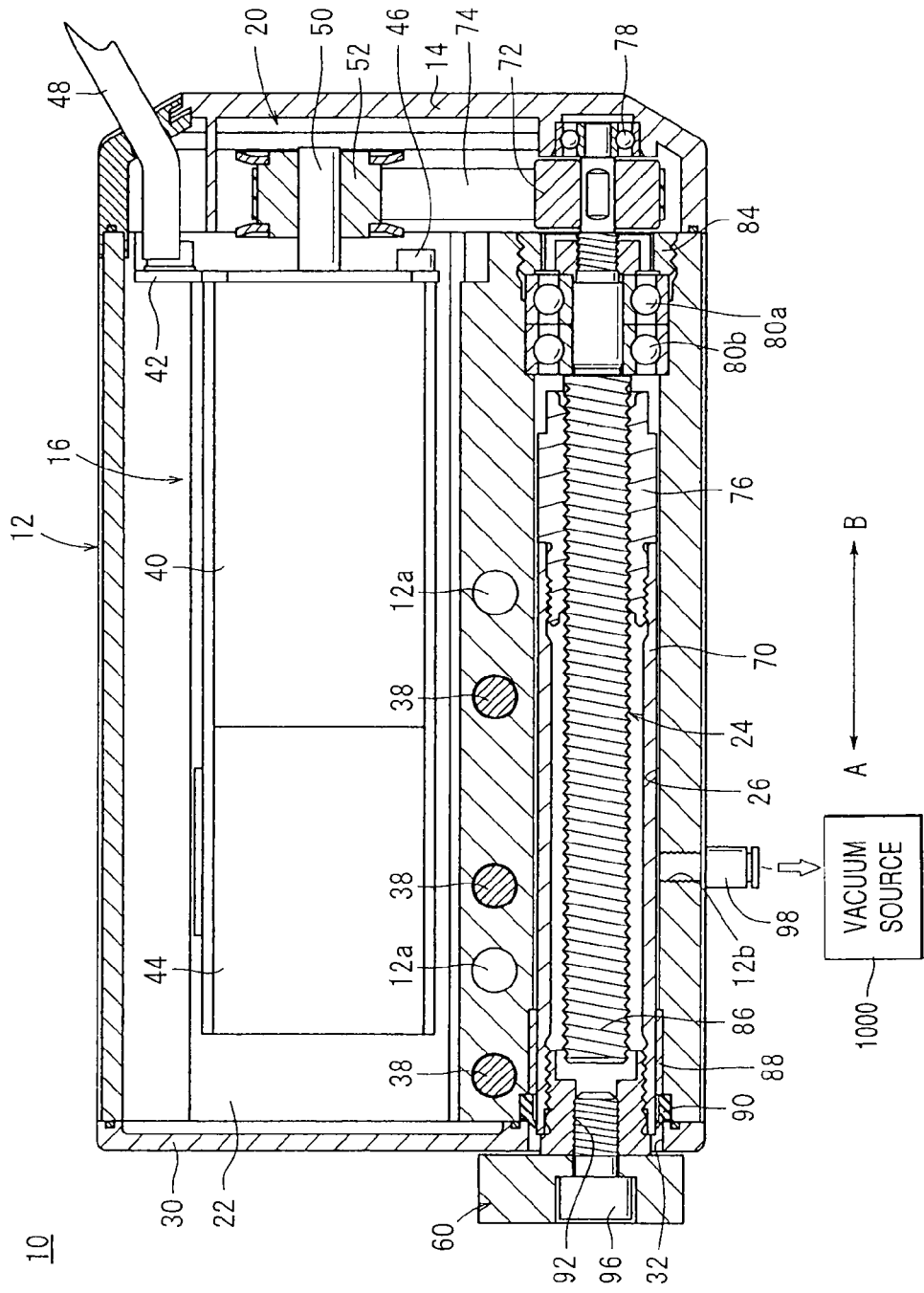
FIG. 11 is a lateral cross sectional view showing a case in which a joint for supplying a negative pressure is provided on the aforementioned electric actuator.

Further, as shown in FIG. 11, a hole 12b is provided in a side portion of the body 12 to which a joint 98 is connected, thus enabling communication between the interior and exterior of the body 12 via the joint 98. In addition, by connection of a negative pressure (i.e., vacuum) supply source 1000 to the joint 98 through a non-illustrated conduit and supplying a negative pressure thereto, discharge of dust to the outside from the body 12 can be prevented as a result of supplying the negative pressure. Stated otherwise, a dust-proofing ability for the electric actuator 10 can be provided. As a result, for example, when the electric actuator 10 is used in a clean room environment, a suitable condition is enabled in that dust or the like is not discharged to the exterior.

Figure 12:
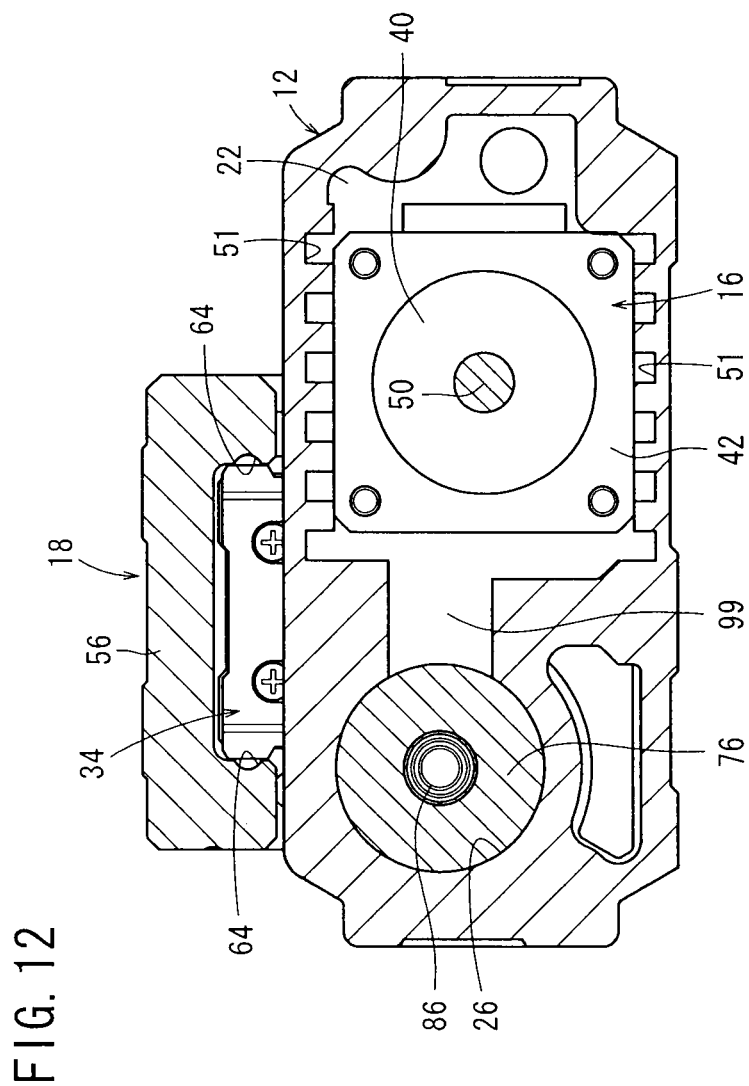
FIG. 12 is a cross sectional view showing a modified example in which a first bore portion and a second bore portion of a body constituting the electric actuator are communicated via a communication hole.

With the electric actuator 10 according to the aforementioned present embodiment, a structure has been described in which the first bore portion 22 accommodating the driving section 16 and the second bore portion 26 through which the feed screw 24 is inserted are provided respectively and independently of each other. However, the present invention is not limited to this configuration. For example, as shown in FIG. 12, a communication hole 99 may be provided, which enables mutual communication between the first bore portion 22 and the second bore portion 26. The communication hole 99 is formed substantially perpendicular with respect to the direction in which the first bore portion 22 and the second bore portion 26 extend. That is, in the body 12, the first bore portion 22, the second bore portion 26, and the communication hole 99 collectively function as a single accommodating portion, which is capable of accommodating both the driving section 16 and the feed screw 24.

Figure 13:
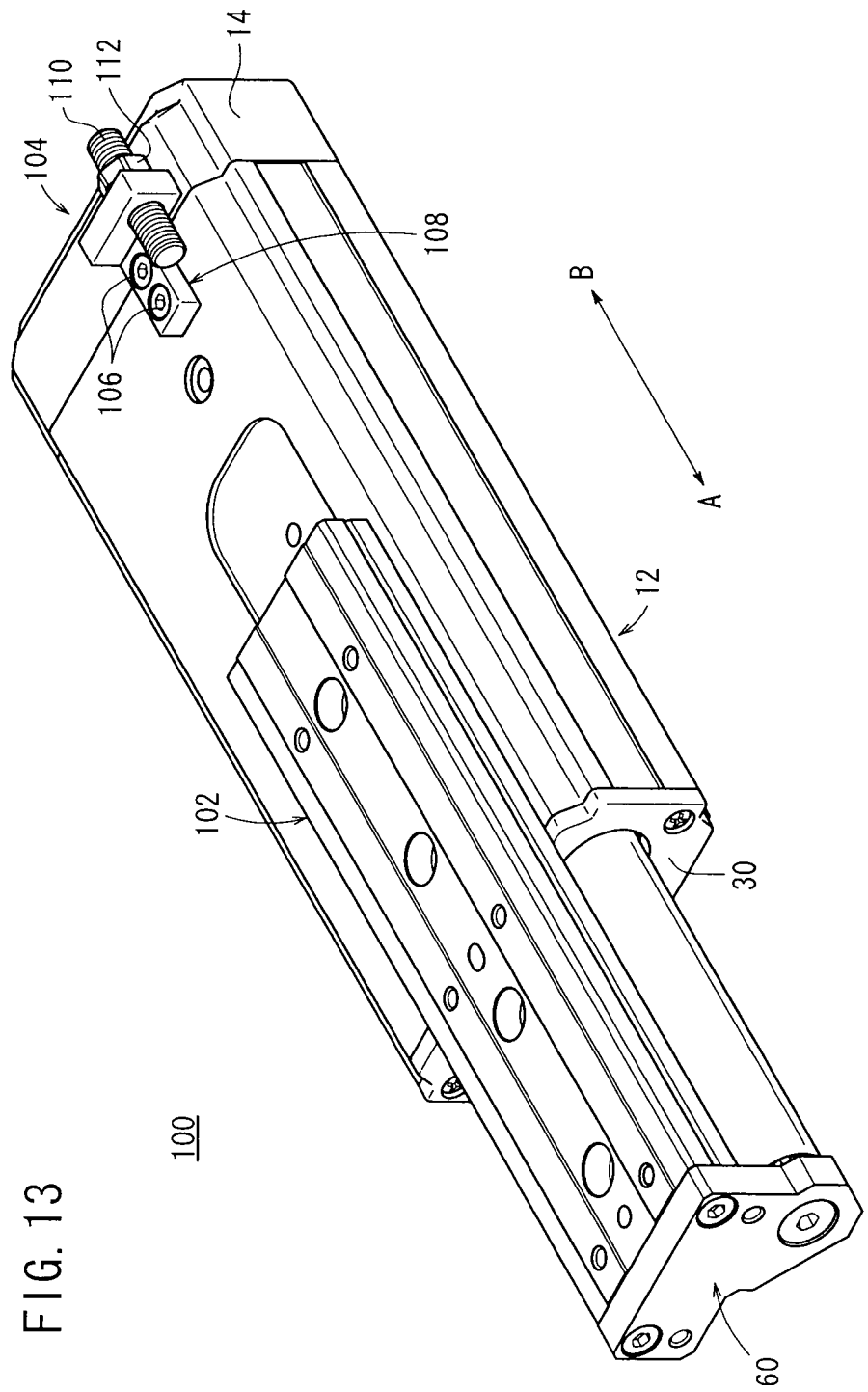
FIG. 13 is an exterior perspective view of an electric actuator according to another embodiment of the present invention.
Figure 14:
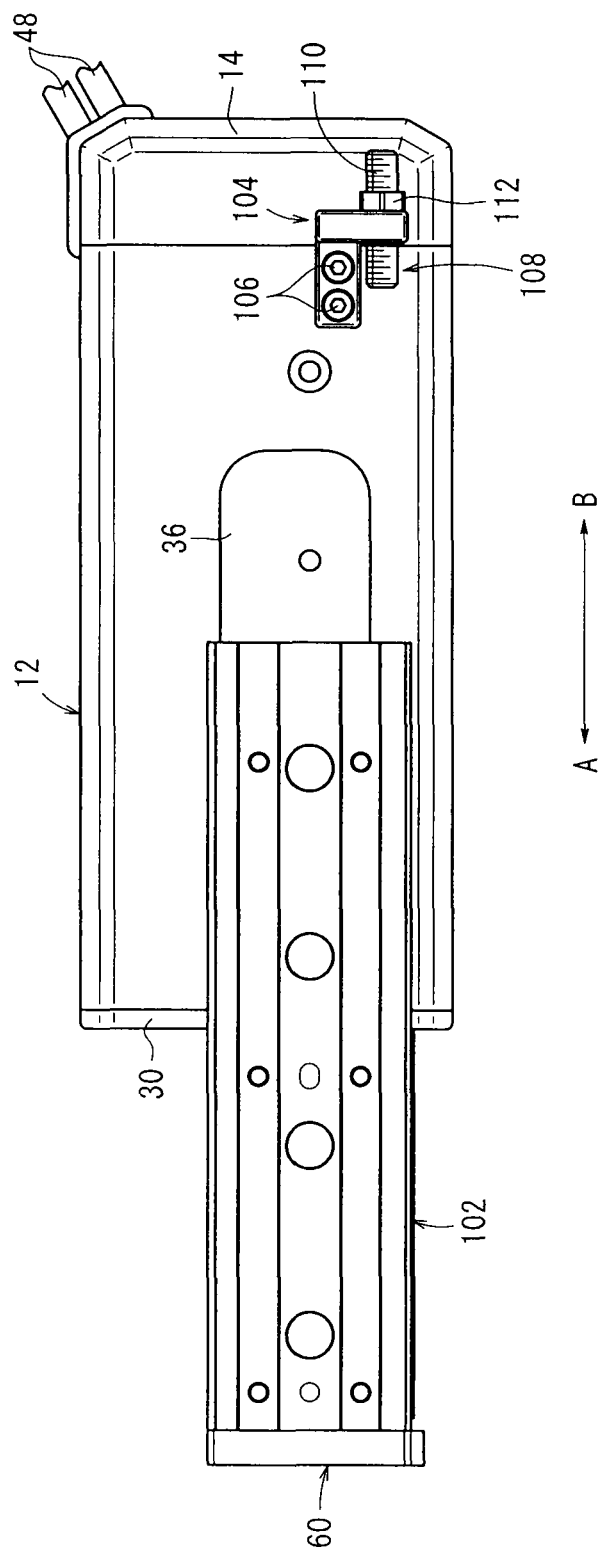
FIG. 14 is a plan view of the electric actuator shown in FIG. 13.
Figure 15:
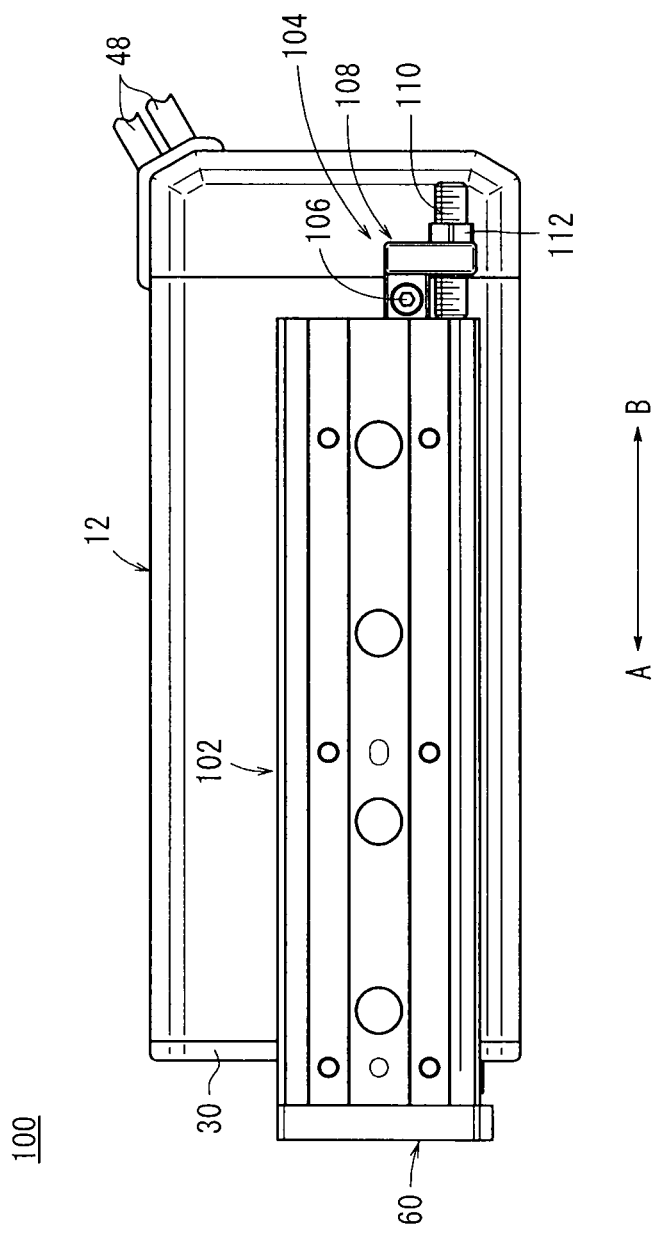
FIG. 15 is a plan view showing a state in the electric actuator of FIG. 14, in which a slider is displaced toward the side of a pulley cover and engaged by an adjustment mechanism.

Next, an electric actuator 100 according to another embodiment is shown in FIGS. 13 through 15. Structural elements thereof, which are the same as those in the electric actuator 10 according to the aforementioned embodiment, are designated by the same reference numerals and detailed explanations of such features are omitted.

The electric actuator 100 according to the other embodiment differs from the electric actuator 10 according to the original embodiment in that an adjuster mechanism (adjustment mechanism) 104 is provided, which is capable of adjusting a displacement amount of a slider 102.

In the electric actuator 100, the adjuster mechanism 104 is disposed on an upper surface of the body 12 for regulating a displacement amount of the slider 102 toward the side of the pulley cover 14 (in the direction of arrow B). The adjuster mechanism 104 includes a block 108 affixed to the body 12 through bolts 106, a stopper pin 110, which is screw-engaged and capable of advancing and retracting with respect to the block 108, and a lock nut 112 for locking the displacement of the stopper pin 110.

The bottom portion of the block 108 is fixed with respect to the body 12, and a stopper pin 110 is threaded into a region that stands perpendicularly with respect to the bottom portion. The stopper pin 110 is disposed so as to be capable of advancing and retracting along an axial direction (the direction of arrows A and B) of the body 12, such that by abutment of the slider 102 against an end of the stopper pin 110, displacement of the slider 102 is stopped by engagement therewith. Further, a lock nut 112 is screw-engaged onto the stopper pin 110 on the pulley cover 14 side of the threaded region of the block 108 (in the direction of arrow B).

More specifically, the stopper pin 110 is screw-rotated with respect to the block 108, and by being displaced in directions (the directions of arrows A and B) to approach and separate with respect to the slider 102, the displacement amount of the slider 102, which abuts against and engages with the stopper pin 110, is capable of being adjusted.

Further, by screw rotation of the lock nut 112 into abutment against the end surface of the block 108, advancing and retracting movements of the stopper pin 110 can be regulated at a condition where the displacement amount of the slider 102 is adjusted, so that the displacement amount of the slider 102 is not shifted and can be maintained reliably and appropriately.

The electric actuator according to the present invention is not limited to the above embodiments. It is a matter of course that various other configurations could be adopted without deviating from the essential nature and gist of the present invention.

What is claimed is:

1. An electric actuator comprising:
    a body having external side surfaces extending in an axial direction of the body, external upper and lower surfaces extending in the axial direction, a first accommodating portion within the body and extending in the axial direction, and a second accommodating portion within the body and extending in the axial direction, wherein the first accommodating portion and the second accommodating portion extend side-by-side and are positioned laterally to one another along a direction of a line connecting the external side surfaces, and wherein the first accommodating portion is comprised by at least an inner surface of the body at a side of the first accommodating portion facing the second accommodating portion and at least inner upper and lower surfaces at sides of the first accommodating portion that face the external upper and lower surfaces and do not face the second accommodating portion;
    a driving section including an electrical motor disposed in the first accommodating portion and driven by an electric signal, the electrical motor being elongated in the axial direction;
    a feed screw extending in the axial direction and disposed in the second accommodating portion, the feed screw being rotated by a driving action of the driving section through a drive force transmission belt;
    a drive force transmission mechanism for transmitting a drive force output in the driving section to the feed screw;
    a displacement member disposed for displacement in the axial direction along, and on, one of the upper and lower external surfaces of the body; and
    a plurality of heat dissipating grooves extending along the axial direction and formed at the inner upper and lower surfaces of the body, wherein said heat dissipating grooves extending along the axial direction and formed at the inner upper and lower surfaces of the body comprise all heat dissipating grooves formed on the body.

2. The electric actuator according to claim 1, wherein the body is produced by molding.

3. The electric actuator according to claim 2, wherein a rotary drive source constituting the driving section is connected to a heat dissipating plate made from a metallic material.

4. The electric actuator according to claim 1, further comprising a hole extending through the body to one of said accommodating portions and connected to a source of low pressure.

5. The electric actuator according to claim 1, wherein the first accommodating portion and the second accommodating portion communicate mutually via a communication hole.

6. The electric actuator according to claim 1, further comprising an adjustment mechanism, which is capable of adjusting a displacement amount of the displacement member along an axial direction of the displacement member.

7. The electric actuator according to claim 6, wherein the adjustment mechanism comprises:
    a block affixed to the body;
    a stopper pin screw-engaged with the block and capable of being advanced and retracted with respect to the block; and
    a lock nut that regulates displacement of the stopper pin.

8. The electric actuator according to claim 1, wherein the body includes a hole extending through the body in a direction perpendicular to an axis of the body, and a fixing bolt that is inserted into the hole is screw-engaged with an external member to fix the body on the external member.

9. The electric actuator according to claim 1, wherein the body includes a screw hole extending through the body in a direction perpendicular to an axis of the body, and a fixing bolt that is inserted into an external member confronting the screw hole is screw-engaged with the screw hole to fix the body on the external member.

* * * * *